(12) United States Patent
Boss et al.

(10) Patent No.: US 10,955,810 B2
(45) Date of Patent: Mar. 23, 2021

(54) MONITORING COMMUNICATIONS FLOW IN AN INDUSTRIAL SYSTEM TO DETECT AND MITIGATE HAZARDOUS CONDITIONS

(71) Applicant: INTERNATIONAL BUSINESS MACHINES CORPORATION, Armonk, NY (US)

(72) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

(21) Appl. No.: 14/940,441

(22) Filed: Nov. 13, 2015

(65) Prior Publication Data
US 2017/0139393 A1 May 18, 2017

(51) Int. Cl.
G05B 19/05 (2006.01)

(52) U.S. Cl.
CPC .. *G05B 19/058* (2013.01); *G05B 2219/13198* (2013.01)

(58) Field of Classification Search
CPC ................... G05B 19/058; G05B 2219/13198
See application file for complete search history.

(56) References Cited

U.S. PATENT DOCUMENTS

| 4,385,349 A | 5/1983 | Ashford et al. |
| 4,975,865 A | 12/1990 | Carrette et al. |

(Continued)

FOREIGN PATENT DOCUMENTS

| EP | 2498156 A2 | 9/2012 |
| GB | 2479315 B | 12/2014 |

(Continued)

OTHER PUBLICATIONS

Heo et al., "Security Correlation Analysis System for Insider Threat Detection of Industrial Control System", The Proceedings of the International Conference in Information Security and digital Forensics, 2014, pp. 49-53.

(Continued)

*Primary Examiner* — Charles R Kasenge
(74) *Attorney, Agent, or Firm* — William Hartwell; Andrew D. Wright; Roberts Calderon Safran & Cole, P.C.

(57) ABSTRACT

A computer-implemented method includes: monitoring, by a computing device, communication flows within an industrial processing system; identifying, by the computing device, a hazardous command based on monitoring the communication flows, wherein identifying the hazardous command includes running a simulation with the communication flows as an input to the simulation; generating, by the computing device, a set of one or more mitigating commands based on identifying the hazardous command; and outputting, by the computing device, the set of one or more mitigating commands to components within the industrial processing system, wherein outputting the set of the one or more mitigating commands reduces a level of hazard caused by the hazardous command.

24 Claims, 8 Drawing Sheets

(56) References Cited

U.S. PATENT DOCUMENTS

| | | | | |
|---|---|---|---|---|
| 5,023,045 A * | 6/1991 | Watanabe | G21D 3/04 | 376/215 |
| 5,101,337 A * | 3/1992 | Ebizuka | G05B 17/02 | 700/79 |
| 6,415,276 B1 * | 7/2002 | Heger | G05B 9/02 | 702/183 |
| 6,774,601 B2 * | 8/2004 | Schwartz | H02P 29/02 | 318/437 |
| 7,082,348 B1 * | 7/2006 | Dahlquist | G05B 13/048 | 162/232 |
| 7,096,159 B2 * | 8/2006 | Cataltepe | G05B 17/02 | 700/110 |
| 7,308,385 B2 * | 12/2007 | Wegerich | G05B 23/0254 | 700/108 |
| 7,349,746 B2 * | 3/2008 | Emigholz | C10G 11/187 | 700/21 |
| 7,451,003 B2 * | 11/2008 | Chester | G05B 23/0254 | 700/28 |
| 7,467,333 B2 * | 12/2008 | Keeton | G06F 11/261 | 703/21 |
| 7,490,031 B1 | 2/2009 | Qiu | | |
| 7,729,808 B2 * | 6/2010 | Nasle | G05B 17/02 | 700/286 |
| 7,899,591 B2 * | 3/2011 | Shah | B60W 50/00 | 123/406.13 |
| 8,024,489 B2 | 9/2011 | Day et al. | | |
| 8,135,481 B2 * | 3/2012 | Blevins | G05B 17/02 | 700/51 |
| 8,150,783 B2 * | 4/2012 | Gonsalves | G06N 7/005 | 706/10 |
| 8,423,397 B2 * | 4/2013 | Sitton | G06Q 10/0635 | 705/7.28 |
| 8,601,587 B1 * | 12/2013 | Powell | G06F 21/552 | 726/25 |
| 9,058,569 B2 * | 6/2015 | Hosking | G06Q 10/0635 | |
| 9,070,288 B2 * | 6/2015 | Lee | G08G 3/02 | |
| 9,424,521 B2 * | 8/2016 | Bloomquist | G06N 5/02 | |
| 9,529,348 B2 * | 12/2016 | Kephart | G05B 17/02 | |
| 9,680,855 B2 * | 6/2017 | Schultz | H04L 63/1433 | |
| 9,760,083 B2 * | 9/2017 | Chung | G05B 19/4065 | |
| 10,068,305 B2 * | 9/2018 | Sisk | G06Q 50/265 | |
| 2006/0036403 A1 * | 2/2006 | Wegerich | G05B 23/0254 | 702/183 |
| 2007/0005266 A1 * | 1/2007 | Blevins | G05B 17/02 | 702/22 |
| 2007/0100478 A1 * | 5/2007 | Egeland | G05B 19/41865 | 700/45 |
| 2008/0082181 A1 * | 4/2008 | Miller | G05B 23/021 | 700/30 |
| 2009/0313605 A1 * | 12/2009 | Ostrand | G06F 11/008 | 717/124 |
| 2010/0023598 A9 * | 1/2010 | Ginter | G06F 21/55 | 709/217 |
| 2010/0036702 A1 * | 2/2010 | Sitton | G06Q 10/04 | 705/7.28 |
| 2010/0222899 A1 * | 9/2010 | Blevins | G05B 17/02 | 700/80 |
| 2011/0130914 A1 * | 6/2011 | Shah | B60W 50/00 | 701/29.5 |
| 2011/0183303 A1 * | 7/2011 | Yamamoto | G05B 17/02 | 434/219 |
| 2012/0083933 A1 * | 4/2012 | Subbu | G06N 3/02 | 700/291 |
| 2012/0109618 A1 * | 5/2012 | Tsai | G06Q 10/0639 | 703/18 |
| 2012/0186408 A1 * | 7/2012 | Vogt | F16P 3/144 | 83/13 |
| 2012/0224046 A1 * | 9/2012 | Waugh | G08B 21/12 | 348/82 |
| 2012/0232869 A1 | 9/2012 | Maturana et al. | | |
| 2012/0260342 A1 * | 10/2012 | Dube | G06F 21/564 | 726/24 |
| 2012/0266245 A1 * | 10/2012 | McDougal | G06F 21/567 | 726/24 |
| 2012/0271538 A1 * | 10/2012 | Lee | G08G 9/02 | 701/117 |
| 2013/0055338 A1 * | 2/2013 | McDougal | G06F 21/56 | 726/1 |
| 2013/0145471 A1 * | 6/2013 | Richard | G06F 21/562 | 726/24 |
| 2013/0198847 A1 * | 8/2013 | Sampigethaya | H04L 63/1433 | 726/25 |
| 2013/0212078 A1 * | 8/2013 | Wilson | H04L 63/1416 | 707/698 |
| 2013/0212154 A1 * | 8/2013 | Lehto | H04L 67/42 | 709/203 |
| 2013/0304266 A1 * | 11/2013 | Giannakis | G01R 21/133 | 700/286 |
| 2014/0047064 A1 * | 2/2014 | Maturana | H04L 67/125 | 709/217 |
| 2014/0047107 A1 * | 2/2014 | Maturana | H04L 43/04 | 709/224 |
| 2014/0095117 A1 * | 4/2014 | Vainshtain | G06F 17/5009 | 703/1 |
| 2014/0200863 A1 * | 7/2014 | Kamat | G01C 15/00 | 703/1 |
| 2014/0244003 A1 * | 8/2014 | Scott | G05B 15/02 | 700/56 |
| 2014/0244004 A1 * | 8/2014 | Scott | B25J 9/1676 | 700/56 |
| 2014/0244036 A1 * | 8/2014 | Scott | B25J 9/1694 | 700/253 |
| 2014/0244037 A1 * | 8/2014 | Scott | B25J 9/1694 | 700/253 |
| 2014/0245449 A1 * | 8/2014 | Powell | G06F 21/552 | 726/25 |
| 2014/0297572 A1 * | 10/2014 | Zambon | H04L 63/0245 | 706/12 |
| 2014/0336791 A1 | 11/2014 | Asenjo et al. | | |
| 2015/0205966 A1 * | 7/2015 | Chowdhury | G06F 21/577 | 726/23 |
| 2016/0063248 A1 * | 3/2016 | Spernow | G06F 21/562 | 726/24 |
| 2016/0212154 A1 * | 7/2016 | Bobritsky | G06F 21/56 | |
| 2016/0241573 A1 * | 8/2016 | Mixer | H04L 63/1416 | |
| 2016/0246269 A1 * | 8/2016 | Ahmed | F24F 11/62 | |
| 2016/0261482 A1 * | 9/2016 | Mixer | H04L 43/12 | |
| 2016/0274558 A1 * | 9/2016 | Strohmenger | G05B 19/0428 | |
| 2016/0301709 A1 * | 10/2016 | Hassanzadeh | H04L 63/1433 | |
| 2016/0366131 A1 * | 12/2016 | Kostadinov | H04L 9/3247 | |
| 2017/0279843 A1 * | 9/2017 | Schultz | H04L 63/1433 | |

FOREIGN PATENT DOCUMENTS

| | | |
|---|---|---|
| JP | 62212708 | 9/1987 |
| JP | 2013016000 | 1/2013 |
| JP | 2013109608 | 6/2013 |
| JP | 2015201086 | 11/2015 |

OTHER PUBLICATIONS

Jacobs, "Behavioral Threat Detection for Industrial Control Systems Networks", Netsecuris Inc., 2012; 8 Pages.

Gligor et al., "Cyber-Security Threats to Industrial Control Systems", https://www.cylab.cmu.edu/research/projects/2013/cybersecurity-threats-industrial-control-systems.html; Accessed Oct. 1, 2015; 2 Pages.

Robertson et al., "Mysterious '08 Turkey Pipeline Blast Opened New Cyberwar", Bloomberg Business, http://www.bloomberg.com/news/articles/2014-12-10/mysterious-08-turkey-pipeline-blast-opened-new-cyberwar, Dec. 10, 2014; 7 Pages.

Zetter, "An Unprecedented Look at Stuxnet, the World's First Digital Weapon", Wired, http://www.wired.com/2014/11/countdown-to-zero-day-stuxnet/, Nov. 3, 2014; 15 Pages.

Abb, "Making Things Easier with a Smaller User Friendly DCS", http://new.abb.com/control-systems/essential-automation/freelance/additional-pages/features/making-things-easier, Accessed Oct. 1, 2015; 9 Pages.

(56) References Cited

OTHER PUBLICATIONS

White House, "Executive Order—Improving Critical Infrastructure Cybersecurity", Office of the Press Secretary, https://www.whitehouse.gov/the-press-office/2013/02/12/executive-order-improving-critical-infrastructure-cybersecurity, Feb. 12, 2013; 10 Pages.

Department of Homeland Security, "Critical Infrastructure Sectors", http://www.dhs.gov/critical-infrastructure-sectors, Aug. 26, 2015; 2 Pages.

* cited by examiner

MONITORING COMMUNICATIONS FLOW IN AN INDUSTRIAL SYSTEM TO DETECT AND MITIGATE HAZARDOUS CONDITIONS

BACKGROUND

The present invention generally relates to industrial process systems, and more particularly, to mitigating hazardous conditions caused by malicious or unintentional commands in industrial process systems.

Modern large scale industrial processes are controlled by a hierarchy of systems, starting with master compute systems, which in turn communicate with industrial controllers (e.g., Programmable Logic Controllers (PLCs)), which then communicate with specific devices, such as machine controls, environmental sensors, valve motors, etc. Examples of complex industrial processes include nuclear, hydro and fossil fuel power plant generation, petroleum extraction and refining, chemical manufacturing, pharmaceutical manufacturing, water supply and water treatment systems, flood control systems, etc. Very little security exists between the master compute systems and the industrial controllers and between the industrial controllers and the physical devices controlled by the industrial controls and from which readings are obtained. Altering, inserting, or disrupting communications in industrial processing systems is accomplished relatively easily (e.g., by hackers), and can cause significant physical damage or injury. Also, certain commands can be unintentionally or accidentally injected into an industrial processing system. Instances of failures in industrial processing systems have become relatively frequent. For example, malicious commands may be injected into industrial processing systems through an internal network or via external networks (e.g., cloud networks).

Currently, individual commands from controllers are checked for their individual validity. As an example, checks are implemented to determine whether a command to set the temperature of a reaction vessel between two pre-established points or no more than a pre-established threshold. However, failures, both minor and catastrophic, can be created in a complex system using only legitimate (individual) values. For example, certain values, which when, taken in their entirety, the set of values (each of which is legitimate in and of itself) is applied to one or multiple components in the system. That is, even a malicious command could be "valid" in that the command may control a device within specified parameters (e.g., a command may open or close a valve within normal operating conditions or angles). However, even a valid command, could cause a failure, potentially hours from the application of the command. Although a master control system may not send a failure set of values or commands, the controllers and their communications networks are susceptible to hacks resulting in alteration of the communications packets and/or the industrial controllers themselves.

This issue affects modern industrial processes, and is especially acute in critical infrastructure systems, in which failures may cause loss of life and/or significant property damage. The impact of a malicious command may not be apparent for hours or days. For example, a command to calibrate a reaction vessel pressure limit set point by one pound per square inch (PSI) increase every hour may take two weeks before the reaction vessel explodes. Since hackers can compromise the master compute system and/or industrial controller, an outside observation and correction system may prevent the catastrophic effects of malicious attacks on industrial processing systems.

SUMMARY

In an aspect of the invention, a computer-implemented method includes: monitoring, by a computing device, communication flows within an industrial processing system; identifying, by the computing device, a hazardous command based on monitoring the communication flows, wherein identifying the hazardous command includes running a simulation with the communication flows as an input to the simulation; generating, by the computing device, a set of one or more mitigating commands based on identifying the hazardous command; and outputting, by the computing device, the set of one or more mitigating commands to components within the industrial processing system, wherein outputting the set of the one or more mitigating commands reduces a level of hazard caused by the hazardous command. In a further aspect, monitoring the communication flows includes monitoring commands and responses to the commands sent between a master compute system, an industrial controller, and a physical device implemented as part of the industrial processing system. In a further aspect, generating the set of one or more mitigating commands includes predicting effects of candidate commands using the simulation, wherein the set of one more mitigating commands is based on the predicted results of the candidate commands.

In an aspect of the invention, there is a computer program comprising a computer readable storage medium having program instructions embodied therewith. The program instructions executable by a computing device to cause the computing device to: observe commands within an industrial processing system; determine a hazard level for a set of one or more of the observed commands using a simulation model that predicts the effects of the set of one or more observed commands; validate the set of one or more observed commands when the hazard level is less than a particular threshold; determine that the one or more observed commands is a hazardous set of commands when the hazard level is equal to or greater than the particular threshold; generate a set of one or more mitigating commands based on determining that the one or more observed commands is a hazardous set of commands; and output the set of one or more mitigating commands to components within the industrial processing system, wherein outputting the set of the one or more mitigating commands reduces a level of hazard caused by the set of hazardous commands. In a further aspect, when outputting the set of one or more mitigating commands, the program instructions cause the computing device to determine particular components in which to output the set of one or more mitigating commands. In a further aspect, the determining that that the one or more observed commands is a hazardous set of commands includes determining that the one or more observed commands includes data that is historically different than data from previous commands of a same type.

In an aspect of the invention, a system includes a CPU, a computer readable memory and a computer readable storage medium associated with a computing device. The system also includes program instructions to observe commands within an industrial processing system; program instructions to determine a hazard level for a set of one or more of the observed commands using a simulation model that predicts the effects of the set of one or more observed commands; program instructions to determine that the one or more observed commands is a hazardous set of commands when the hazard level is equal to or greater than the particular threshold; program instructions to generate a set of one or more mitigating commands based on determining that the one or more observed commands is a hazardous set of commands program instructions to predict the effects of the set of one or more mitigating commands using the simulation model; program instructions to modify the set of one or more mitigating commands based on the predicted effects; and program instructions to output the modified set of one or more mitigating commands to components within the industrial processing system, wherein outputting the modified set of the one or more mitigating commands reduces a level of hazard caused by the set of hazardous commands. The program instructions are stored on the computer readable storage medium for execution by the CPU via the computer readable memory. In a further aspect, the outputting the modified set of one or more mitigating commands include determining particular components in which to output the set of one or more mitigating commands.

In an aspect of the invention, a computer-implemented method comprising: monitoring, by a computing device, communication flows within an industrial processing system; identifying, by the computing device, a hazardous command based on the monitoring the communication flows, generating, by the computing device, a set of one or more mitigating commands based on the identifying the hazardous command; and outputting, by the computing device, the set of one or more mitigating commands to components within the industrial processing system, wherein the outputting the set of the one or more mitigating commands reduces a level of hazard caused by the hazardous command. In a further aspect, the monitoring the communication flows includes monitoring commands and responses to the commands sent between a master compute system, an industrial controller, and a physical device implemented as part of the industrial processing system.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
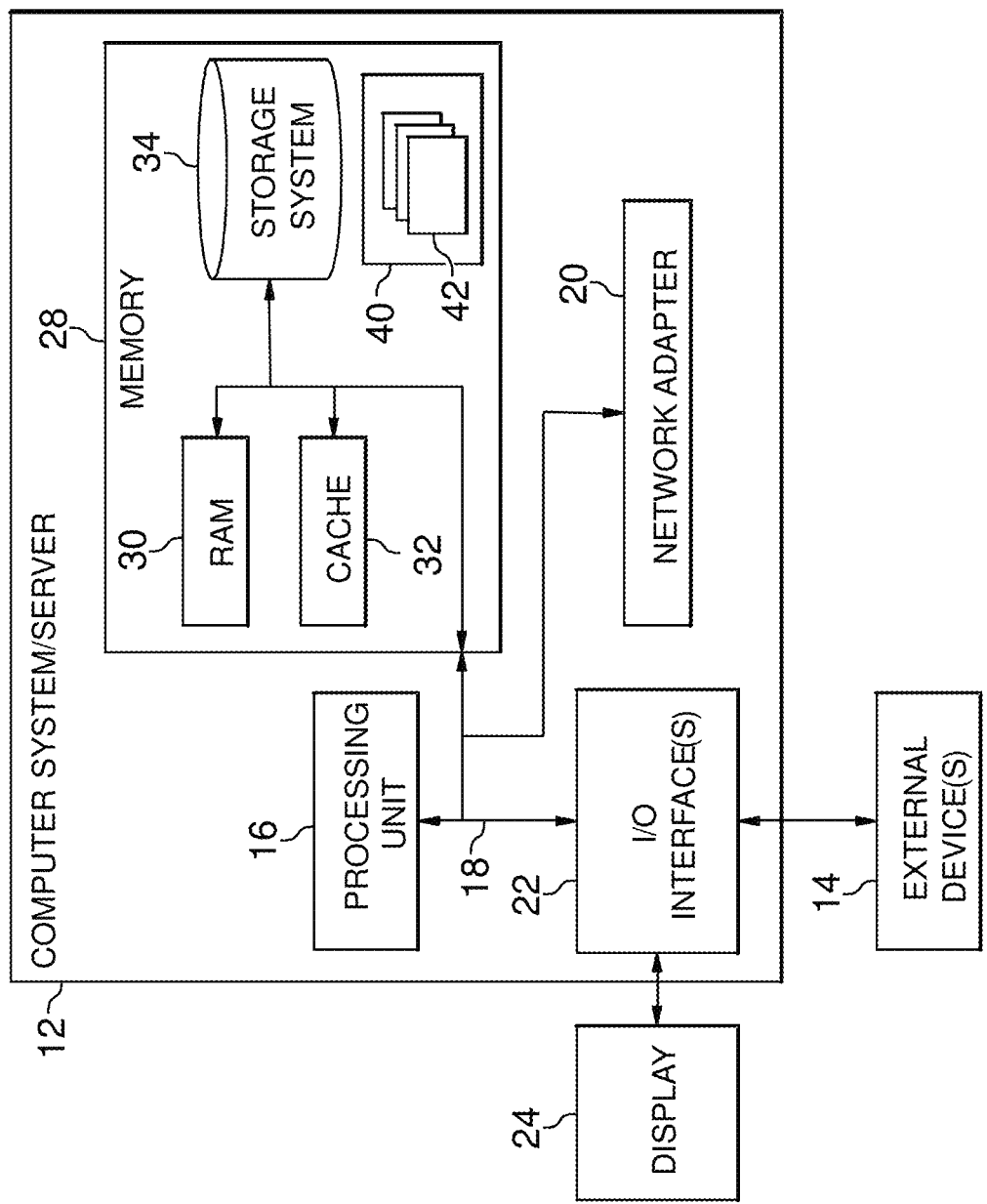
FIG. 1 depicts a cloud computing node according to an embodiment of the present invention.

The present invention generally relates to industrial processing systems, and more particularly, to mitigating hazardous conditions caused by malicious or unintentional commands or communication flows in industrial processing systems. Aspects of the present invention include a system and/or method for observing communications flows (e.g., commands or command responses) sent within an industrial processing system, processing commands through a simulation model of the industrial process system, and identifying hazardous conditions (e.g., conditions which may lead to failures in the physical infrastructure in the immediate or near future). Aspects of the present invention further mitigate the hazardous condition by sending mitigating commands to counteract previous commands through Injection points (also referred to as injection TAPs). In embodiments, mitigating commands counteract the effects of hazardous commands, such as malicious commands or unintentional commands injected into the industrial processing system. In embodiments, mitigating commands also counteract the effects of hazardous commands injected by malicious parties via an internal network or via an external network (e.g., cloud network). As described herein, the term "command" may refer to an instruction, communication flow, or response between components in an industrial processing system (e.g., between master computer systems, industrial controllers, and individual physical devices).

In accordance with aspects of the present invention, systems and/or methods may determine a location (e.g., particular components) in the industrial processing system in which an injection TAP mitigating command should be sent (e.g., to the master controller, industrial controller, and/or device) in order to counteract or mitigate hazardous conditions. Further, the systems and/or methods may determine particular injection TAP mitigating command(s) to sufficiently counteract the effects of a command that causes a hazardous condition (e.g., a malicious command, an accidentally created command, etc.). Further, the systems and/or methods may determine when a mitigating command will have the desired effect, and when to inject the mitigating commands (e.g., spreading out the mitigating commands over time, or sending all mitigating commands immediately).

In accordance with aspects of the present invention, one or more mitigating commands into may or may not be injected or output to the device which triggered the hazardous condition. In alternatives embodiments, one or more mitigating commands may be injected with a delay (e.g., minutes or hours) after the observation which triggered the identification of a hazardous condition. In embodiments, the injection of one or more mitigating commands may intentionally not fully mitigate a hazardous condition.

In embodiments, mitigation action may be dynamically created based on the existing condition or state of the system and is more robust than a simple if/then rule construct. For example, aspects of the present invention are more robust than Intrusion Prevention System (IPS), Data Loss Prevention (DLP), Web Content Filtering (WCF) and similar inspection and mitigation technologies which simply implement if/then rules. Aspects of the present invention may implement mitigating actions/commands in real-time or may implement mitigating actions with a delay based on the best course of action to take to diffuse a hazardous condition caused by a malicious command. Further, aspects of the present invention are more robust than implementing if/then rules, as implementation of the invention may take into consideration a collection of multiple different variables, system configurations, and scenarios to determine mitigating commands for diffusing a hazardous condition.

As an illustrative example, assume that a command is observed to increase the temperature setting by 20° C. on a reaction vessel. In accordance with aspects of the present invention, the command is processed through a simulation model. Assume that the simulation model indicates that the command would result in a hazardous condition or situation five hours from the time the command was injected into the system (e.g., an explosion or damage to system components). Given this assumption, a hazardous condition is identified based on the results of the simulation model, and a set of mitigation commands is determined. As an example, the mitigation commands may include reducing the temperature setting (e.g., by 5° C.), waiting a period of time (e.g., one hour), reducing the temperature setting an additional amount (e.g., 5° C.) if the temperature is greater than a particular threshold (e.g., 237° C.), introduce a particular amount of a particular solution to the reaction vessel (e.g., 1,000 gallons of $H_2SO_4$), and activate another device for a particular amount of time (e.g., an agitator for 15 minutes).

As described in the above example, the mitigation command was not simply to reduce the temperature setting by 20° C., as would be the case of a simple if/then rule. In the above example, the temperature could be reduced (as part of the mitigation action), reversing the temperature set point of the system which had been previously set by the hazardous command. However, as described in the above example, proper mitigation would not be to simply reverse the hazardous command, rather, the proper mitigation would involve various other actions to reduce or elimination the effects of hazardous caused by a hazardous command.

As another example, assume that a hazardous command is identified (e.g., a command to add 1000 units of NACL to a reaction vessel). In this example, the mitigation may be to add 2000 units of $H_2O$ if the temperature is less than 100° C., but to add 50 units of HCL if the temperature is above 100° C. As described herein, simulation models may be used to aid in the determination of the mitigating commands (e.g., in addition to using the simulation models to identify a hazardous condition). In the above example, the hazardous command could not simply be reversed by "subtracting" the 1000 units of NACL, thus implementing a simple if/then rule, as is used in current security protocols. Advantageously, aspects of the present invention improve safety and security in industrial control systems, preventing injury, loss of life, destruction of property, disruption of normal activities, etc., and providing significant value and advantages to conventional systems.

Aspects of the present invention provide a technical solution to the problem of security in industrial control systems. For example, aspects of the present invention analyze data from commands, normalize commands provided by different types of devices, and implement a technical simulation model to normalized command data to determine hazardous conditions. As described herein, weighting algorithms may be used to determine whether a command is a "hazardous" command (e.g., a command that would lead to a hazardous condition). Aspects of the present invention process command data by comparing real-time commands with historical commands, and identifying potentially hazardous commands based on the comparison. Aspects of the present invention generate weights or scores for a set of commands indicating a level of danger of commands and of the predicted outcomes of commands. Aspects of the present invention generate technical solutions by determining mitigating commands based on a set of data identifying current operating conditions, system configurations, and the predicted effects of real-time commands. Further, aspects of the present invention inject the mitigating commands in an industrial processing system to mitigate or diffuse a predicted hazardous scenario, and alert site personnel regarding the predicted hazardous scenario. Aspects of the present invention effectively validate the integrity of the data within a command, or detect improper modification of the data (e.g., by a malicious attacker, or by accidental modification) by monitoring the command and determining the predicted effect of the command. For example, if a command would lead to a hazardous outcome, the detection of this hazardous outcome is proactively identified and mitigated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
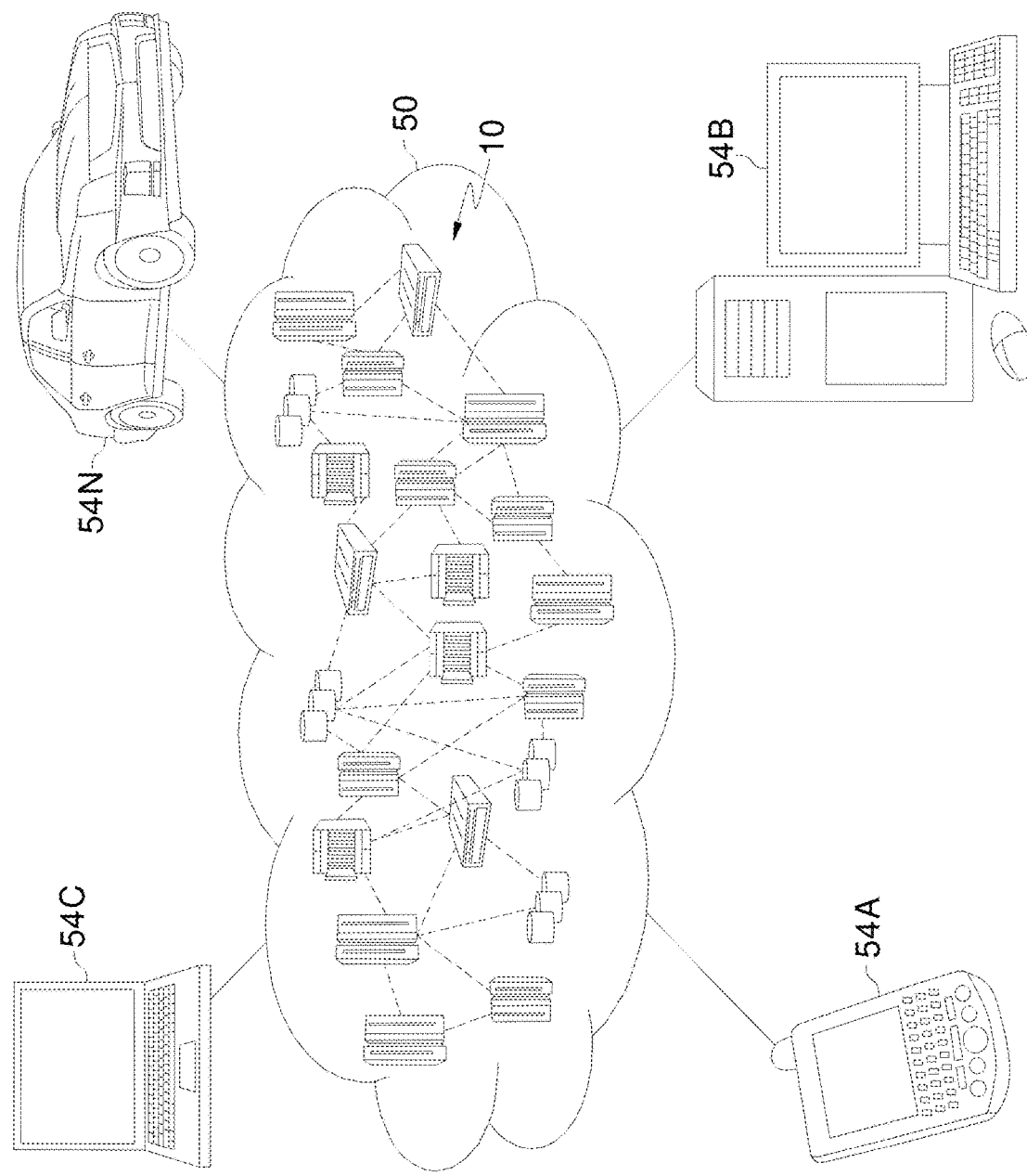
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
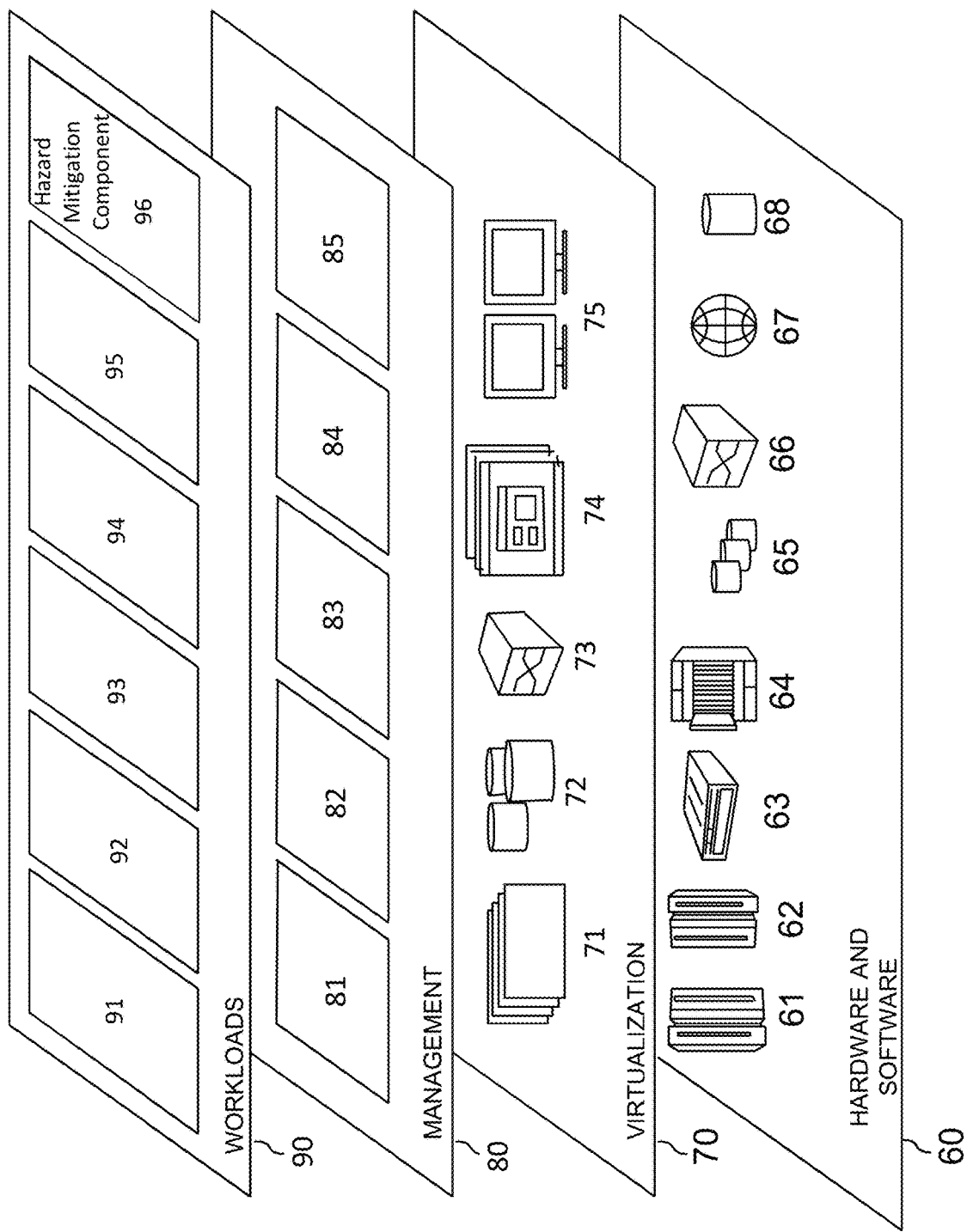
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hazard mitigation component 96.

Referring back to FIG. 1, the Program/utility 40 may include one or more program modules 42 that generally carry out the functions and/or methodologies of embodiments of the invention as described herein. Specifically, the program modules 42 may monitor/observe commands output from master compute systems and industrial controllers, normalize and store the commands, generate simulation models for a particular command using normalized command data, identify hazardous condition based on the results of the simulation models and/or historical commands, generate mitigating commands and alerts, and output the mitigating commands and alerts. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a hazard mitigation component 96 in FIG. 4.

Figure 4:
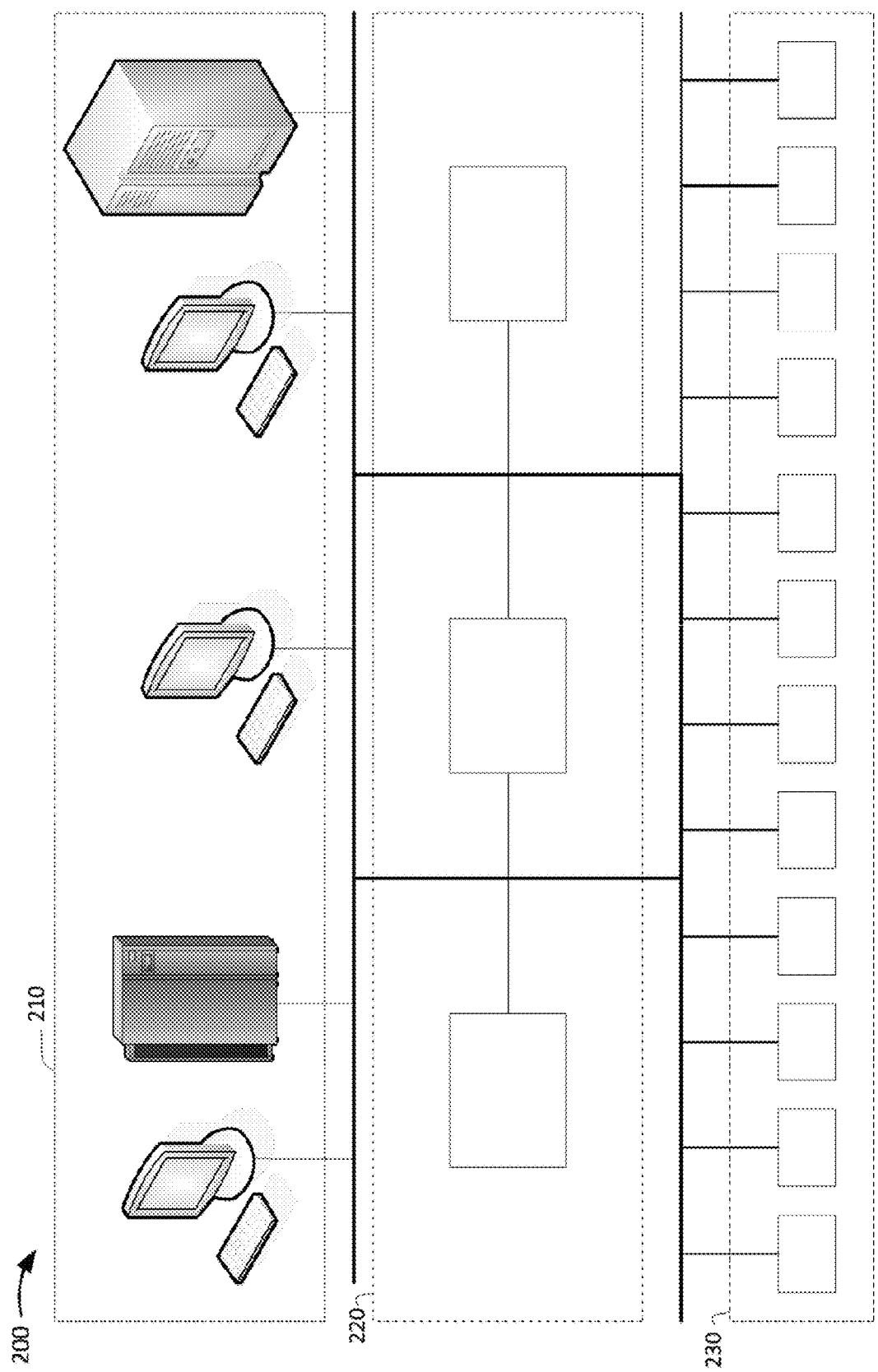
FIG. 4 shows an overview of an example industrial processing system in accordance with aspects of the present invention.

FIG. 4 shows an overview of components within an example industrial processing system in accordance with aspects of the present invention. As shown in FIG. 4, an industrial processing system 200 is organized in a hierarchy in which master computer systems 210 communicate with industrial controllers 220, which then in turn communicate with devices 230. Alternatively, master compute systems 210 may communicate directly with devices 230 without involving the industrial controllers 220. In embodiments, the industrial processing system 200 may include additional, fewer, or differently arranged components than shown in FIG. 4.

Figure 5:
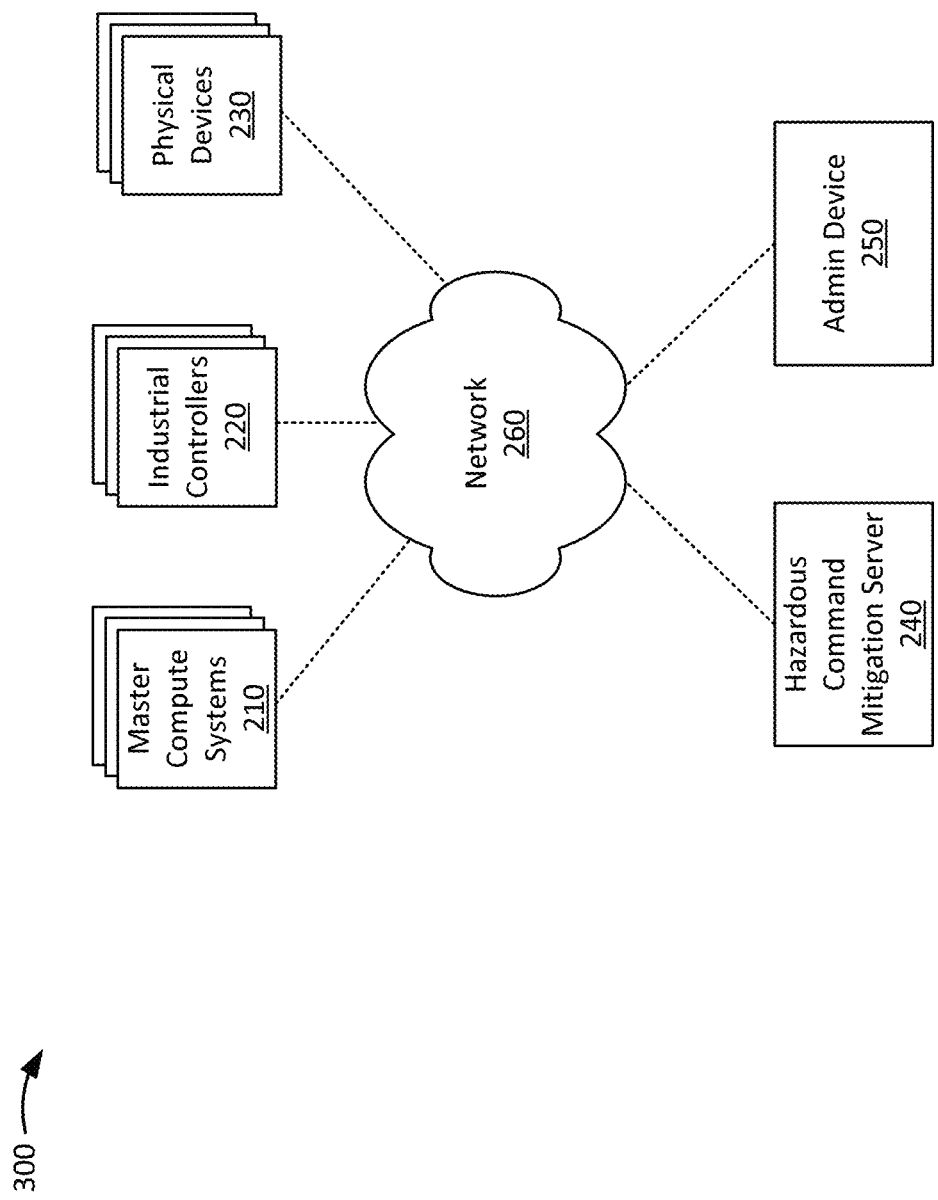
FIG. 5 shows an example environment in accordance with aspects of the present invention.

FIG. 5 shows an example environment in accordance with aspects of the present invention. As shown in FIG. 5, environment 300 may include master compute systems 210, industrial controllers 220, physical devices 230, hazardous command mitigation server 240, and network 250. In embodiments, one or more components in environment 200 may correspond to one or more components in the cloud computing environment of FIG. 2.

The master compute systems 210 may include one or more computing devices (e.g., server devices, mainframes, etc.) that output master commands to the industrial controllers 220. As an example, a master command is a high-level, general command, such as increasing or reducing the temperature of a reaction chamber. In embodiments, the master compute systems 210 may generate control commands and output the control commands directly to the physical devices 230 without involving the industrial controllers 220. As described herein, the master compute systems 210 may receive mitigating commands from the hazardous command mitigation server 240, and output the mitigating commands to the industrial controllers 220 and/or directly to the physical devices 230.

The industrial controllers 220 may include one or more computing devices that interpret master commands output by the industrial controllers 220, translate the master commands into control commands for particular physical devices 230, and output the control commands to the particular physical devices 230. As an example, a master command from the master compute systems 210 instructs the industrial controllers 220 to increase the temperature of reaction vessel. Given this situation, the industrial controllers 220 may translate the master command into a control command to instruct one or more particular physical devices 230 to open or close valves within the reaction vessels, add particular solutions to the reaction vessel, etc. As described herein, the industrial controllers 220 may receive mitigating commands from the hazardous command mitigation server 240, and output the mitigating commands to the physical devices 230.

The physical devices 230 may include sensors (e.g., temperature sensors, fluid level sensors, fluid composition sensors), valve controls, thermostats, heating/ventilation/air conditioning (HVAC) systems, solenoids, and/or any type of device that can be controlled either directly or indirectly by the master compute systems 210 and/or the industrial controllers 220. The physical devices 230 may receive and execute control commands received from the master compute systems 210, industrial controllers 220, and/or hazardous command mitigation server 240.

The hazardous command mitigation server 240 may include one or more computing devices that observes/monitors commands output from master compute systems and industrial controllers, normalize and store the commands, generate simulation models for a particular command using normalized command data, identify hazardous condition based on the results of the simulation models and/or historical commands, generate mitigating commands and alerts, and output the mitigating commands and alerts. In embodiments, the hazardous command mitigation server 240 may output the mitigating commands to the master compute systems 210, industrial controllers 220, and/or to the physical devices 230 depending on the hazardous condition, and the mitigation of the hazardous condition. In embodiments, the hazardous command mitigation server 240 may output alerts to an admin device 250 associated with an operator or management personnel associated with the industrial processing system. In embodiments, the hazardous command mitigation server 240 may be implemented as a computer system/server 12 of FIG. 1, and may include program modules (e.g., program modules 42 of FIG. 1) configured to perform processes described herein.

The admin device 250 may include one or more computing devices that receive information regarding alerts and/or mitigating commands from the hazardous command mitigation server 240. An operator or management personnel may then act on the alerts by taking appropriate action to help mitigate a hazardous condition identified by the alert.

The network 250 may include network nodes, such as network nodes 10 of FIG. 2. Additionally, or alternatively, the network 250 may include one or more wired and/or wireless networks. For example, the network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 300 is not limited to what is shown in FIG. 5. In practice, the environment 200 may include additional devices and/or networks; fewer devices and/or networks; different devices and/or networks; or differently arranged devices and/or networks than illustrated in FIG. 5. Also, in some implementations, one or more of the devices of the environment 300 may perform one or more functions described as being performed by another one or more of the devices of the environment 200. Devices of the environment 200 may interconnect via wired connections, wireless connections, or a combination of wired and wireless connections.

Figure 6:
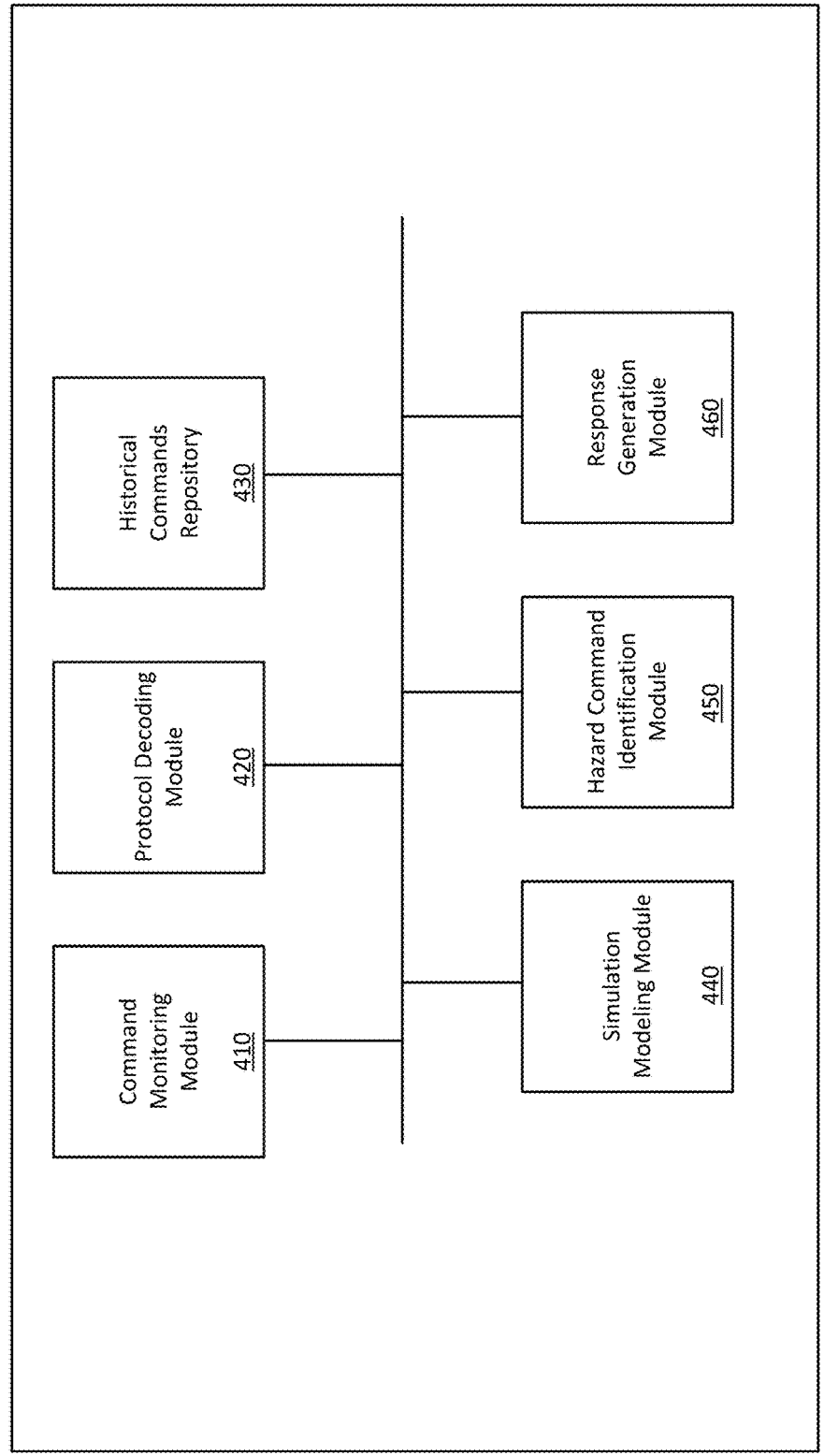
FIG. 6 shows a block diagram of example components of a hazardous command mitigation server in accordance with aspects of the present invention.

FIG. 6 shows a block diagram of example components of a hazardous command mitigation server in accordance with aspects of the present invention. As shown in FIG. 6, the hazardous command mitigation server 240 may include a command control monitoring module 410, a protocol decoding module 420, a historical commands repository 430, a simulation modeling module 440, a hazard command identification module 450, and a response generation module 460. In embodiments, the hazardous command mitigation server 240 may include additional or fewer components than those shown in FIG. 6. In embodiments, separate components may be integrated into a single computing component or module. Additionally, or alternatively, a single component may be implemented as multiple computing components or modules.

The command control monitoring module 410 may include a program module (e.g., program module 42 of FIG. 1) that monitors (e.g., observes) commands sent by the master compute systems 210 and the industrial controllers 220 in an industrial processing system. For example, a monitoring TAP (e.g., connection) is established from the control channels between the master compute systems 210 and the industrial controllers 220, and from the control channels between the industrial controllers 220 and the physical devices 230. The command control monitoring module 410 may store and/or output the monitored commands (e.g., to the protocol decoding module 420).

The protocol decoding module 420 may include a program module (e.g., program module 42 of FIG. 1) that "normalizes" command data from the master compute systems 210 and the industrial controllers 220. For example, master commands from the master compute systems 210 and control commands from the industrial controllers 220 may be in different formats, units, codes, programming languages, etc. The protocol decoding module 420 normalizes the commands into a data format interpretable and usable by the simulation modeling module 440. In embodiments, the protocol decoding module 420 may output normalized command data to the historical commands repository 430 and/or the simulation modeling module 440.

The historical commands repository 430 may include a data storage system (e.g., storage system 34 of FIG. 1) that stores commands as they are output or injected through the industrial processing system. The historical commands repository 430 may store the commands for any period of time as needed.

The simulation modeling module 440 may include a program module (e.g., program module 42 of FIG. 1) that receives normalized command data from protocol decoding module 420 and may perform a simulation for a single command or group of commands outputted by the master compute systems 210 and/or the industrial controllers 220. The simulation predicts the effects of a command in order to determine whether a command is hazardous. In embodiments, the simulation modeling module 440 may use any number of simulation techniques, such as discrete simulation modeling, continuous modeling, algebraic modeling, stochastic modeling, deterministic modeling, dynamic system simulation modeling, local or distributed modeling, and/or other simulation techniques. As an illustrative example, the results of a simulation may predict a temperature of a solution, a pressure of a fluid, and/or other effect of a command. The results of the simulation may predict the effects over a period of time (e.g., the pressure of a fluid or of a chamber minutes, hours, or days after a command is processed).

In embodiments, the simulation modeling module 440 may also predict the effects of a mitigating command. For example, multiple candidate mitigating command sets may be inputted into the simulation modeling module 440, and the simulation modeling module 440 may execute a simulation model to predict the effects of the candidate mitigating command sets. The simulation modeling module 440 may mark candidate mitigating commands as "effective" or "ineffective" based on the results of the simulation model. In alternative embodiments, the simulation modeling module 440 may generate an "effectiveness score" identifying the degree of effectiveness a set of mitigating commands would have in diffusing a hazardous condition or situation. For example, the effectiveness score may be based on the time to diffuse or mitigate the hazardous condition, the danger level of implementing the mitigating commands, etc. Based on the results, the candidate mitigating command set having the best predicted outcome would be selected and injected (e.g., output) throughout the industrial processing system.

The hazard command identification module 450 may include a program module (e.g., program module 42 of FIG. 1) that determines whether a command is hazardous based on results of a simulation from the simulation modeling module 440 and based on historical commands stored by the historical commands repository 430. In embodiments, the hazard command identification module 450 may generate a hazard score for a command, and the score may be weighted based on the results of the simulation and/or historical commands. For example, if a command was not historically injected into the industrial processing system at the same time in the past, the hazard command identification module 450 may more heavily weight or increase the hazard score than if the command had been previously injected.

If a particular command is out of sequence from when the command has historically been injected, a particular pre-determined weighting or score may be assigned. If a particular command is new in relation to commands historically injected/observed, a different pre-determined weighting or score may be assigned. If the content of the command is different than a typical command historically injected/observed, a different pre-determined weighting or score may be assigned. In embodiments, any combination of pre-determined weightings may be used to calculate a hazard score for a particular command. Further, the results of the simulation for a command may be used (e.g., in combination with comparing historical commands) to generate the hazard score. In embodiments, when the hazard score exceeds a particular threshold, a message is output to the response generation module 460. In embodiments, the response generation module 460 may assess the hazard of a command (e.g., determine the hazard score) each time a command is observed. Additionally, or alternatively, the hazard command identification module 450 may generate the hazard score and analyze the hazard score on-demand, at periodic intervals, etc.

The response generation module 460 may include a program module (e.g., program module 42 of FIG. 1) that receives a message or indication from the hazard command identification module 450 identifying a hazardous command. The response generation module 460 may generate mitigating commands to counteract or mitigate the effects of the hazardous command(s). In an embodiment, the response generation module 460 may generate mitigating commands based on the results from a simulation model associated with the hazardous command(s). For example, the response generation module 460 may generate mitigating commands in order to counteract the predicted effects as identified by data from the simulation model. In embodiments, the response generation module 460 may communicate with the simulation modeling module 440 to generate simulation models to predict the effect of candidate sets of mitigating commands.

The response generation module 460 may select the candidate set of mitigating commands in which the predicted outcome is most favorable (e.g., most effectively mitigates the effects of the hazardous command). For example, the response generation module 460 may select the candidate set of mitigating commands that most quickly and safely mitigates the effects of the hazardous commands. In alternative embodiments, the response generation module 460 may select the candidate set of mitigating commands based on cost variables (e.g., a combination of the least costly, least waste producing, fastest, and safest set of commands would be selected). In alternative embodiments, the response generation module 460 may generate mitigating commands based on mitigating commands that have previously been used for similar types of hazards. In alternative embodiments, the response generation module 460 may generate mitigating commands based on a set of predefined commands for particular types of hazards.

In alternative embodiments, an operator may manually generate a set of mitigating commands, or may modify a set of mitigating commands generated by the response generation module 460. In embodiments, the mitigating commands may be used to control particular devices at particular times in order to mitigate the effects of a hazardous command. The mitigating commands may include delays, conditional rules, etc. The results of the simulations for mitigating commands may be used to adjust the mitigating commands (e.g., adjust the sequence of the commands, the content of the commands, the delay of the commands, etc.).

Figure 7:
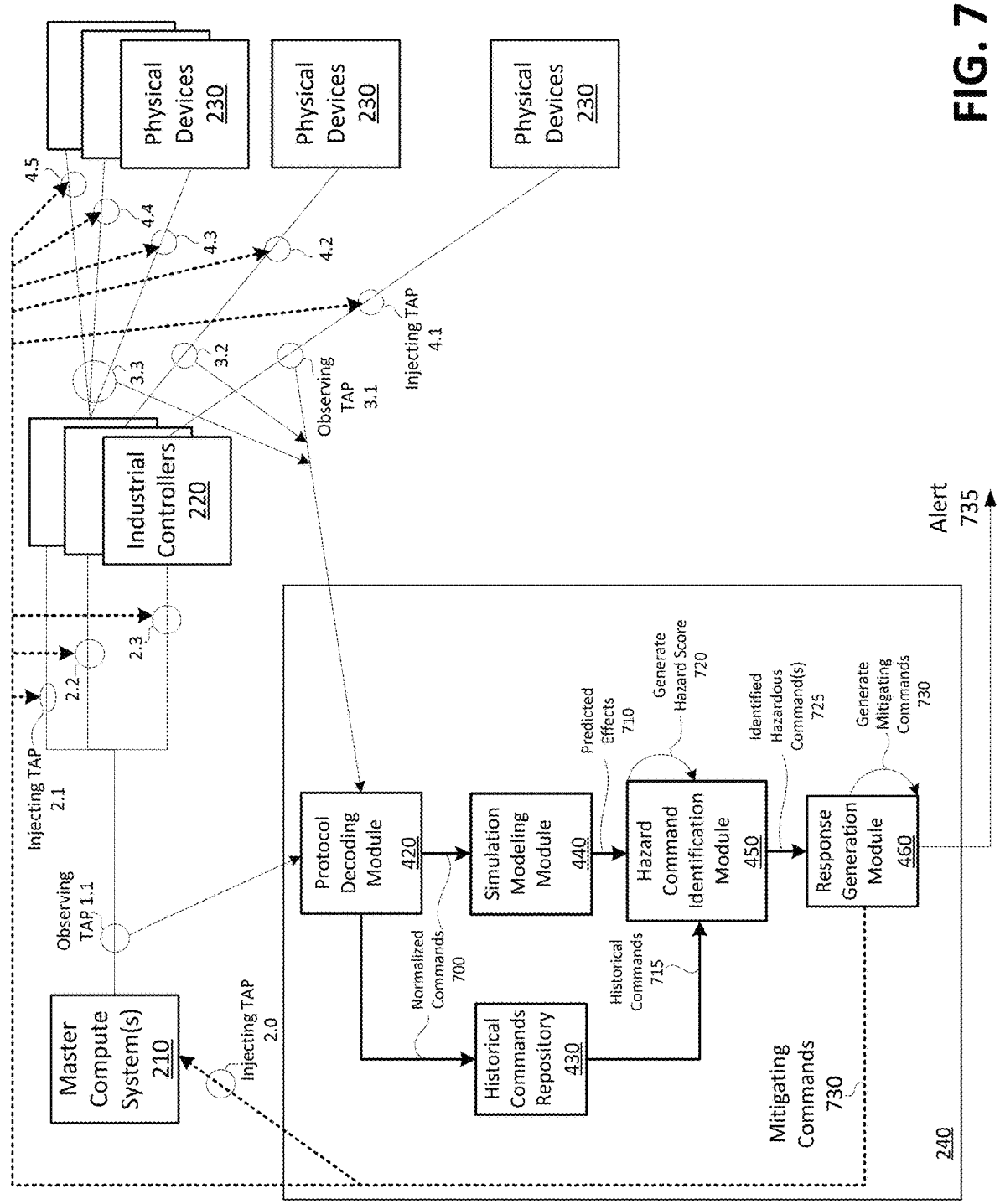
FIG. 7 shows a diagram of example processes for mitigating hazardous conditions in an industrial processing system in accordance with aspects of the present invention.

FIG. 7 shows a diagram of example processes for mitigating hazardous conditions in an industrial processing system in accordance with aspects of the present invention. As shown in FIG. 7, master compute systems 210 output commands to industrial controllers 220, and the hazardous command mitigation server 240 observes (e.g., monitors) the commands and communication flows via an observing TAP 1.1. For example, the protocol decoding module 420 may monitor the commands. The commands are injected to industrial controllers 220 from the master compute systems 210 via injecting TAPs (e.g., injecting TAPS 2.1, 2.2, and 2.3). Commands from the industrial controllers 220 to the physical devices 230 are observed by the hazardous command mitigation server 240 (e.g., by the protocol decoding module 420) via observing TAPs 3.1, 3.2, and 3.3. Also, responses to commands (e.g., readouts and/or other types of responses) from the physical devices 230 to the industrial controllers 220 are observed via the observing TAPs 3.1, 3.2, and 3.3. In embodiments, the response to the commands may include temperature measurements, rotation per minute (RPM) measurements, and/or other types of measurements/readouts. Commands from the industrial controllers 220 to the physical devices 230 are injected to the physical devices 230 via injecting TAPs 4.1, 4.2, 4.3, 4.4, and 4.5.

Based on monitoring the commands/responses via observing TAPs, 1.1, 3.1, 3.2, and 3.3, the protocol decoding module 420 may normalize the commands and output the normalized commands 700 to the historical commands repository 430 and the simulation modeling module 440. The historical commands repository 430 may store the normalized commands 700. For each command (or for a group of multiple commands over a period of time), the simulation modeling module 440 may execute one or more simulation models and output predicted effects 710 to the hazard command identification module 450. The hazard command identification module 450 may receive the predicted effects 710 from the simulation modeling module 440, and historical commands 715 from the historical commands repository 430. Based on the predicted effects 710 and/or the historical commands 715, the hazard command identification module 450 may generate a hazard score 720 (e.g., for a single command or for a group of commands). When the score 720 exceeds a threshold, the hazard command identification module 450 may output an indication, to the response generation module 460, of the identified hazardous command(s) 725. The response generation module 460 may generate mitigating commands 730, and output the mitigating commands to the master compute systems 210, the industrial controllers 220, and/or the physical devices 230 (e.g., via injecting TAPs, 2.0, 2.1, 2.2, 2.3, 4.1, 4.2, 4.3, and/or 4.4.). For example, as described herein, when generating the mitigating commands 730, the response generation module 460 may also identify a location (e.g., components) in the industrial processing system to inject the commands. In embodiments, the response generation module 460 may output an alert 735 (e.g., to an admin device 250). While a particular quantity of master compute systems 210, industrial controllers 220, physical devices 230, observing TAPs, and injecting TAPs, are shown in FIG. 7, in practice, any quantity and arrangement of master compute systems 210, industrial controllers 220, physical devices 230, observing TAPs, and injecting TAPs may be implemented for various industrial processing systems.

Figure 8:
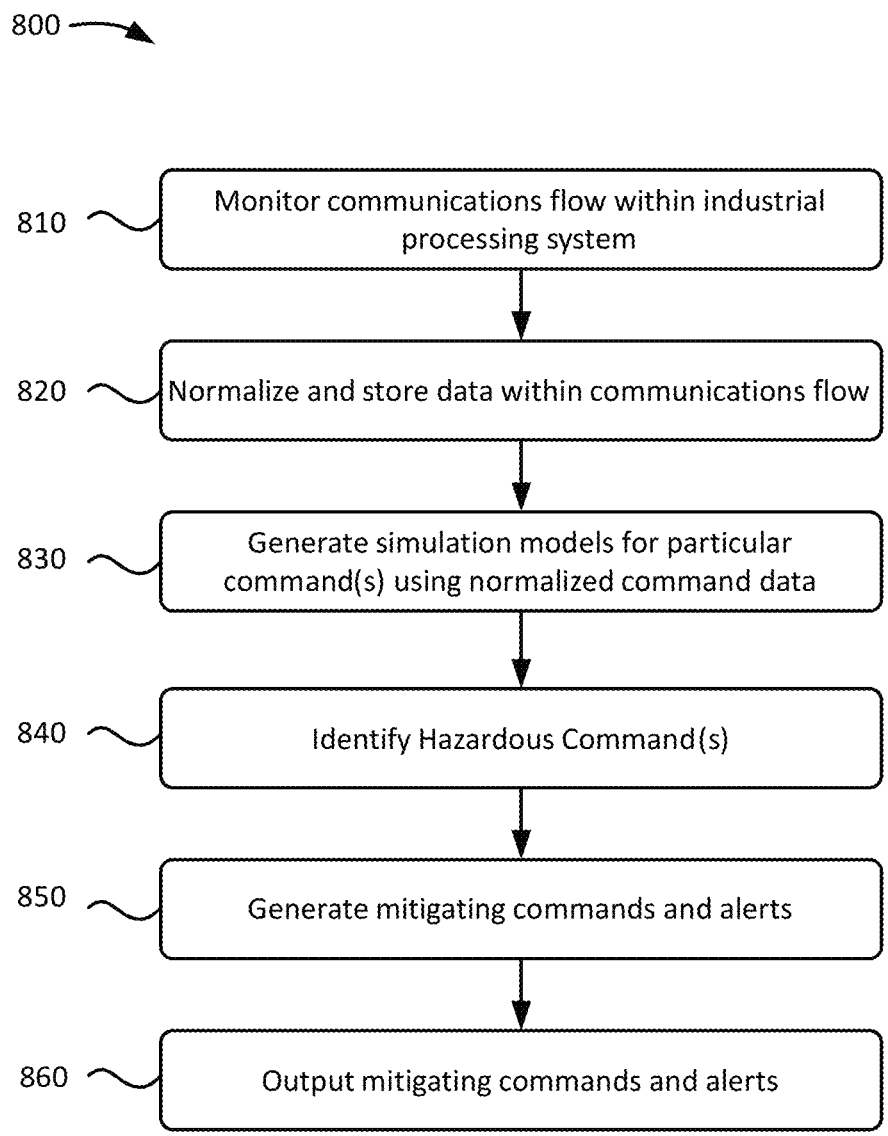
FIG. 8 shows an example flowchart for mitigating hazardous conditions in an industrial processing system in accordance with aspects of the present invention.

FIG. 8 shows an example flowchart for mitigating hazardous conditions in an industrial processing system in accordance with aspects of the present invention. The steps of FIG. 8 may be implemented in the environment of FIGS. 5 and 7, for example, and are described using reference numbers of elements depicted in FIGS. 5 and 7. As noted above, the flowchart illustrates the architecture, functionality, and operation of possible implementations of systems, methods, and computer program products according to various embodiments of the present invention.

As shown in FIG. 8, process 800 may include monitoring communications flow within an industrial processing system (step 810). For example, as described above with respect to the command control monitoring module 410, the hazardous command mitigation server 240 may monitor communications flow, such as commands output from the master compute systems 210 to the industrial controllers 220, and the commands output from the industrial controllers 220 to the physical devices 230. Additionally, or alternatively, the hazardous command mitigation server 240 may monitor communications flows, such as responses to commands output by the physical devices 230. In embodiments, hazardous command mitigation server 240 may monitor the communications flow via observing TAPs (e.g., as described with respect to FIG. 7).

Process 800 may also include normalizing and storing data within the communications flow (step 820). For example, as described above with respect to the protocol decoding module 420 and the historical commands repository 430, the hazardous command mitigation server 240 may "normalize" command and response data from the master compute systems 210 and the industrial controllers 220. For example, master commands from the master compute systems 210 and control commands from the industrial controllers 220 may be in different formats, units, codes, programming languages, etc. The protocol decoding module 420 normalizes the commands into a data format interpretable and usable by the simulation modeling module 440. In embodiments, the protocol decoding module 420 may output normalized command data to the historical commands repository 430 for storage.

Process 800 may further include generating simulation models for particular command(s) using normalized command data (step 830). For example, as described above with respect to the simulation modeling module 440, the hazardous command mitigation server 240 may perform a simulation for a single command or a group of commands outputted by the master compute systems 210 and/or the industrial controllers 220. The simulation predicts the effects of a command (or group of commands) in order to determine whether the command is hazardous. In embodiments, the hazardous command mitigation server 240 may use any number of simulation techniques, such as discrete simulation modeling, continuous modeling, algebraic modeling, stochastic modeling, deterministic modeling, dynamic system simulation modeling, local or distributed modeling, and/or other simulation techniques. As an illustrative example, the results of a simulation may predict a temperature of a solution, a pressure of a fluid, and/or other effect of a command. The results of the simulation may predict the effects over a period of time (e.g., the pressure of a fluid or of a chamber minutes, hours, or days after a command is processed).

Process 800 may also include identifying hazardous command(s) (step 840). For example, as described above with respect to the hazard command identification module 450, the hazardous command mitigation server 240 may determine whether a command is hazardous based on results of a simulation from the simulation modeling module 440 and based on historical commands stored by the historical commands repository 430 (e.g., commands that are historically different than data of previous similar commands or commands of a same type). If a command (or group of commands) exceeds a predefined threshold, the hazardous command mitigation server 240 determines that a hazardous condition or hazardous event is imminent. Additional details and examples regarding the scoring of commands is described above with respect to the hazardous command mitigation server 240.

Process 800 may further include generating mitigating commands and alerts (step 850). For example, as described above with respect to response generation module 460, the hazardous command mitigation server 240 may generate mitigating commands to counteract or mitigate the effects of the hazardous command(s). In an embodiment, the hazardous command mitigation server 240 may generate mitigating commands based on the results from a simulation model associated with the hazardous command(s). For example, the hazardous command mitigation server 240 may generate mitigating commands in order to counteract the predicted effects as identified by data from the simulation model. In embodiments, the hazardous command mitigation server 240 may implement simulation models to predict the effect of candidate sets of mitigating commands.

In alternative embodiments, the hazardous command mitigation server 240 may iteratively run simulation models based on results from previous simulations. For example, the hazardous command mitigation server 240 may input a set of mitigating commands as an input to a simulation model. Based on the results of the simulation, the hazardous command mitigation server 240 may adjust (e.g., improve) the set of mitigating commands, and re-run the simulation. The hazardous command mitigation server 240 may continue running simulations until the simulation predicts a desirable outcome (e.g., an outcome that effectively mitigates a hazardous condition). In embodiments, the hazardous command mitigation server 240 may generate an alert indicating a hazardous condition (e.g., the type of condition, the portions of the industrial processing system affected by the hazardous condition, suggested mitigating commands to diffuse the hazardous condition, or an identification that a mitigating command was unable to be determined etc.). Additional details regarding the selection and generation of mitigating commands is described above with respect to the response generation module 460 in FIG. 6.

Process 800 may also include outputting the mitigating commands and alerts (step 860). For example, as described above with respect to the response generation module 460, the hazardous command mitigation server 240 may output the mitigating commands to the components of the industrial processing system, such as master compute systems 210, the industrial controllers 220, and/or the physical devices 230 (e.g., via injection TAPs as described above with respect to FIG. 7). As described above, the hazardous command mitigation server 240 may output the mitigating commands with delays (e.g., when delaying the injection of commands would produce a more favorable result). In embodiments, the hazardous command mitigation server 240 may output an alert identifying the hazardous condition and/or hazardous command(s) to the admin device 250.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   monitoring, by a computing device, communication flows within an industrial processing system;
   identifying, by the computing device, a hazardous command based on the monitoring the communication flows, wherein the identifying the hazardous command includes running a simulation with the communication flows as an input to the simulation, wherein results of the simulation predict that the hazardous command results in a hazardous condition that is predicted to lead to a failure in physical infrastructure;
   generating, by the computing device, a set of one or more mitigating commands based on the identifying the hazardous command; and
   outputting, by the computing device, the set of one or more mitigating commands to components within the industrial processing system, wherein the outputting the set of the one or more mitigating commands reduces a level of hazard caused by the hazardous command,
   wherein the generating the set of one or more mitigating commands includes predicting effects of candidate commands using the simulation, wherein the set of one more mitigating commands is based on the predicted results of the candidate commands and the set of one or more mitigating commands is based on the most favorable outcome.

2. The method of claim 1, wherein the monitoring the communication flows includes monitoring commands and responses to the commands sent between a master compute system, an industrial controller, and a physical device implemented as part of the industrial processing system.

3. The method of claim 1, wherein the hazardous command is a set of a plurality of commands.

4. The method of claim 1, wherein the outputting the set of one or more mitigating commands includes determining particular components in which to output the set of one or more mitigating commands.

5. The method of claim 1, wherein the outputting the set of one or more mitigating commands includes determining a time or a delay in which to output the set of one or more mitigating commands.

6. The method of claim 1, wherein the identifying the hazardous command includes determining that the hazardous command includes data that is historically different than data of previous commands of a same type.

7. The method of claim 1, further comprising:
   identifying a plurality of hazardous commands; and
   ranking the plurality of hazardous commands based on a predicted level of danger associated with each of the plurality of hazardous commands.

8. The method of claim 1, further comprising outputting an alert identifying the hazardous command or the hazardous condition associated with the hazardous command.

9. The method of claim 1, wherein a service provider at least one of creates, maintains, deploys and supports the computing device.

10. The method of claim 1, wherein steps of claim 1 are provided by a service provider on a subscription, advertising, and/or fee basis.

11. The method of claim 1, wherein the computing device includes software provided as a service in a cloud environment.

12. The method of claim 1, further comprising deploying a system for mitigating effects of hazardous commands, comprising providing a computer infrastructure operable to perform the steps of claim 1.

13. The method of claim 1, wherein the hazardous condition is not related to physical contact between a human and another object.

14. A computer program product comprising a computer readable storage device having program instructions embodied therewith, the program instructions executable by a computing device to cause the computing device to:
 observe commands within an industrial processing system;
 determine a hazard level for a set of one or more of the observed commands using a simulation model that predicts the effects of the set of one or more observed commands;
 validate the set of one or more observed commands when the hazard level is less than a particular threshold;
 determine that the one or more observed commands is a hazardous set of commands when the hazard level is equal to or greater than the threshold, wherein results of the simulation predict that the hazardous set of commands lead to failure in physical infrastructure;
 generate a set of one or more mitigating commands based on determining that the one or more observed commands is a hazardous set of commands; and
 output the set of one or more mitigating commands to components within the industrial processing system, wherein outputting the set of the one or more mitigating commands reduces a level of hazard caused by the set of hazardous commands.

15. The computer program product of claim 14, wherein the simulation model includes at least one of:
 a discrete simulation model;
 a continuous simulation model;
 an algebraic simulation model;
 a stochastic simulation model;
 a deterministic simulation modeling;
 a dynamic system simulation modeling; and
 a local or distributed simulation model.

16. The computer program product of claim 14, wherein the outputting the set of one or more mitigating commands includes determining particular components in which to output the set of one or more mitigating commands.

17. The computer program product of claim 14, wherein the outputting the set of one or more mitigating commands includes determining a time or a delay in which to output the set of one or more mitigating commands.

18. The computer program product of claim 14, wherein the determining that that the one or more observed commands is a hazardous set of commands includes determining that the one or more observed commands includes data that is historically different than data of previous commands of a same type.

19. A system comprising:
 a CPU, a computer readable memory and a computer readable storage medium associated with a computing device;
 program instructions to observe commands within an industrial processing system;
 program instructions to determine a hazard level for a set of one or more of the observed commands using a simulation model that predicts the effects of the set of one or more observed commands;
 program instructions to determine that the one or more observed commands is a hazardous set of commands when the hazard level is equal to or greater than the particular threshold, wherein results of the simulation predict that the hazardous set of commands lead to failure in physical infrastructure;
 program instructions to generate a set of one or more mitigating commands based on determining that the one or more observed commands is a hazardous set of commands;
 program instructions to predict the effects of the set of one or more mitigating commands using the simulation model;
 program instructions to modify the set of one or more mitigating commands based on the predicted effects; and
 program instructions to output the modified set of one or more mitigating commands to components within the industrial processing system, wherein outputting the modified set of the one or more mitigating commands reduces a level of hazard caused by the set of hazardous commands,
 wherein the program instructions are stored on the computer readable storage medium for execution by the CPU via the computer readable memory.

20. The system of claim 19, wherein the program instruction to output the modified set of one or more mitigating commands include program instructions to determine particular components in which to output the set of one or more mitigating commands, wherein the particular components are physical devices.

21. A computer-implemented method comprising:
 predicting, by a computing device, an effect of a command within an industrial processing system, wherein the predicting comprises running a simulation with the command as an input to the simulation and the predicted effect being an output of the simulation, and wherein the command is output from a master compute system to an industrial controller or from the industrial controller to one of plural physical devices in the industrial processing system;
 generating, by the computing device, a hazard score of the command based on the predicted effect and historical commands;
 determining the command is a hazardous command based on comparing the hazard score to a threshold value;
 generating, by the computing device, a set of one or more mitigating commands based on the determining the command is a hazardous command; and
 outputting, by the computing device, the set of one or more mitigating commands to components within the industrial processing system, wherein the outputting the set of the one or more mitigating commands counteracts or mitigates the predicted effect.

22. The method of claim 21, wherein the command is a set of a plurality of commands.

23. The method of claim 21, wherein the outputting the set of one or more mitigating commands includes determining a particular one of the plural physical devices in which to output the set of one or more mitigating commands.

24. The method of claim 21, wherein the generating the set of one or more mitigating commands comprises:
   generating plural candidate sets of mitigating commands;
   predicting respective effects of the plural candidate sets of mitigating commands using simulation models; and
   selecting one of the plural candidate sets of mitigating commands as the set of one or more mitigating commands based on the predicting the respective effects.

* * * * *